United States Patent [19]
Muller

[11] 3,827,711
[45] Aug. 6, 1974

[54] FRONT WHEEL SUSPENSION FOR A PASSENGER MOTOR VEHICLE

[75] Inventor: Alf Muller, Bittenfeld, Germany

[73] Assignee: Daimler-Benz Aktiengesellschaft, Stuttgart, Germany

[22] Filed: Aug. 15, 1973

[21] Appl. No.: 388,656

[30] Foreign Application Priority Data
Dec. 30, 1972 Germany............................ 2264278

[52] U.S. Cl............................ 280/96.2 B, 280/96.3
[51] Int. Cl................................................ B62d 7/20
[58] Field of Search............ 280/95 A, 96.1, 96.2 R, 280/96.2 B, 96.3, 95 R

[56] References Cited
UNITED STATES PATENTS
2,672,597  3/1954  Ritch, Jr........................ 280/96.2 B
2,890,893  6/1959  Laukhuff....................... 280/96.2 B

*Primary Examiner*—M. Henson Wood, Jr.
*Assistant Examiner*—Michael Y. Mar
*Attorney, Agent, or Firm*—Craig & Antonelli

[57] ABSTRACT

A front wheel suspension for motor vehicles which includes a steering system disposed essentially to the rear of a vehicle cross plane containing the wheel centers that contains a steering linkage and a steering gear, as well as a wheel guide system formed by double cross guide members which include each a forward guide arm extending substantially in the vehicle cross direction and a rear guide arm forming the longitudinal support of the suspension; the cross guide members are elastically connected to the vehicle superstructure in points of pivotal connection which form a wide support base; the steering axis of the wheels which is determined by the points of pivotal connection of the cross guide members with the wheel carrier thereby extends obliquely downwardly and forwardly and intersects the vehicle cross plane containing the wheel centers intermediate the wheel center and the point of contact of the wheel and is so inclined in relation to the respective wheel plane that a steering roll radius results which is equal to or smaller than zero.

12 Claims, 5 Drawing Figures

FRONT WHEEL SUSPENSION FOR A PASSENGER MOTOR VEHICLE

The present invention relates to a front wheel suspension for motor vehicles, especially passenger motor vehicles, with a steering system including a steering linkage and a steering gear, disposed at least essentially to the rear of a vehicle cross plane containing the wheel centers, as well as with a wheel guide system constituted by double cross guide members, in which the cross guide members include forward guide arms extending in the vehicle transverse direction and rear guide arms forming the longitudinal support and in which the cross guide members are elastically retained in the points of pivotal connection thereof on the body side which form a wide support base.

In front wheel suspensions of this type with the indicated wide support base for the guide members, the support forces are small in the points of pivotal connection on the body side and the elastic support in the points of pivotal connection, which is decisive for the noise and shock insulation, therefore does not affect disadvantageously the driving behavior. Consequently, with front wheel suspensions of this type, heavy and costly so-called driving stool constructions can be dispensed with. Furthermore, with such types of front wheel suspensions, the important wheel-guiding structural parts as well as also the steering linkage and steering gear are located far-reachingly to the rear of the vehicle cross plan containing the wheel centers so that the danger of damage for these parts in case of front end collisions is relatively slight which is significant for the safety of the entire vehicle.

However, the accommodation of the tires which are relatively wide in modern vehicles involves considerable difficulties with such types of front wheel suspensions, especially with a view for the narrow turning radius additionally required of such vehicles, which necessitate relatively large wheel deflection angles especially for the wheels on the inside of the curve. As a result of the orientation of the guide members toward the rear and of a corresponding arrangement of steering linkage and steering gear in the space disposed at least essentially to the rear of the vehicle cross plane containing the wheel centers, the available space is strongly restricted within this vehicle area.

Additionally, the accommodation of shock absorbers and springs causes difficulties with such types of front wheel suspensions, which by reason of the upper guide member which customarily surrounds the spring and shock absorber in the shape of a triangle, have to be displaced far toward the vehicle center which in turn constricts the engine space and also results in an indirect shock-absorber- and/or spring-transmission whereby the forces introduced into the body increase and the damping responds more poorly.

Starting with this background, the present invention is concerned with the task to so further develop a front wheel suspension of the aforementioned type that notwithstanding the limited available space in the area to the rear of the vehicle cross plane containing the wheel centers, sufficiently large wheel deflection angles and therewith sufficiently narrow turning radii as well as a shock-absorber and spring-transmission, which is as direct as possible, can be realized.

The underlying problems are solved according to the present invention in that the steering axis of the wheels which is determined by the points of pivotal connection of the cross guide members with the wheel carrier and which is inclined obliquely forwardly and downwardly, as viewed in side view, extends through the vehicle cross plane containing the wheel centers intermediate the wheel center and the point of contact of the wheel with the road surface and in that the steering axis is so inclined with respect to the respective wheel plane that a steering roll radius results which is either zero or smaller than zero. A larger utilizable engine space width results from the arrangement and construction according to the present invention with the same track and body width and with the same wheel deflection. Furthermore, also a gain in space in the vehicle longitudinal direction is achieved for the deflected front wheels. The relatively large positive caster angle which exists in such a solution, brings about that the point of pivotal connection of the upper guide member with the wheel carrier is displaced so far toward the rear that the upper guide member can be moved out of the area of the spring and shock absorber and can be displaced completely behind the same so that the location of the spring and shock absorber is no longer impaired by the upper guide member and can be selected in an optimum manner. In addition to the attained space gain which forms a prerequisite for a practical realization of the entire front wheel suspension, the front wheel suspension according to the present invention is characterized also by an altogether considerably simplified construction and by reductions in weight as well as savings in cost compared to the hitherto known front wheel suspension of the type here in question. Particularly noteworthy in conjunction with the already indicated advantages is the improvement of the straight running and the insensitivity against unilateral brake pulling which are achieved by the solution of the present invention. In a corresponding manner also a swerving in case of a one-sided tire damage is avoided by the solution according to the present invention. Last but not least also unilateral road impacts have as a consequence lesser interferring and disturbance moments on the steering system in the solution according to the present invention, which from an overall point of view is extraordinarily precise and enables a very accurate steering work. Therebeyond, also the sensitivity against tire nonuniformities is reduced by the overall construction of the front wheel suspension according to the present invention, and by reason of the pivotal connection of the guide members, a relieving of the forward frame longitudinal bearers and of the front section of the vehicle is achieved so that the vehicle front section can be constructed correspondingly light weight without the danger of the so-called front-section-shaking. Additionally, the front wheel suspension according to the present invention effects during steering deflections a strong camber change of both wheels in the direction toward the inside of the curve which results in an improvement of the curve lateral guidance.

Accordingly, it is an object of the present invention to provide a front wheel suspension for motor vehicles, especially passenger motor vehicles, which avoids by simple means the aforementioned shortcomings and drawbacks encountered in the prior art.

Another object of the present invention resides in a front wheel suspension which facilitates the accommodation of wide tires without impairing the narrow turning radii required of modern vehicles.

A further object of the present invention resides in a front wheel suspension for passenger motor vehicles which optimizes the available space within the engine for purposes of a completely satisfactory suspension.

A still further object of the present invention resides in a front wheel suspension which facilitates the accommodation of the shock absorbers and springs while at the same time assuring good response of the damping and appropriate introduction of the forces into the body.

Another object of the present invention resides in a front wheel suspension which results in a larger utilizable engine space with same track and vehicle width and with same wheel deflection.

A further object of the present invention resides in a front wheel suspension which permits an effective gain of space in the vehicle longitudinal direction for the deflections of the steerable wheels.

Still a further object of the present invention resides in a front wheel suspension for motor vehicles which excels by simple and light weight construction as well as ease of assembly and which entails considerable savings in costs compared to the known wheel suspensions of the type in question.

Another object of the present invention resides in a front wheel suspension which not only improves the straight running properties but also increases the insensivity gainst unilateral brake-pulling.

A further object of the present invention resides in a front wheel suspension which greatly increases the safety due to the avoidance of a swerving of the vehicle in case of tire damages on one side of the vehicle.

Another object of the present invention resides in a front wheel suspension of the type described above which entails all of the advantages mentioned hereinabove yet is extraordinarily precise and accurate in its steering action.

These and other objects, features and advantages of the present invention will become more apparent from the following description when taken in connection with the accompanying drawing which shows, for purposes of illustration only, one embodiment in accordance with the present invention, and wherein.

Figure 1:
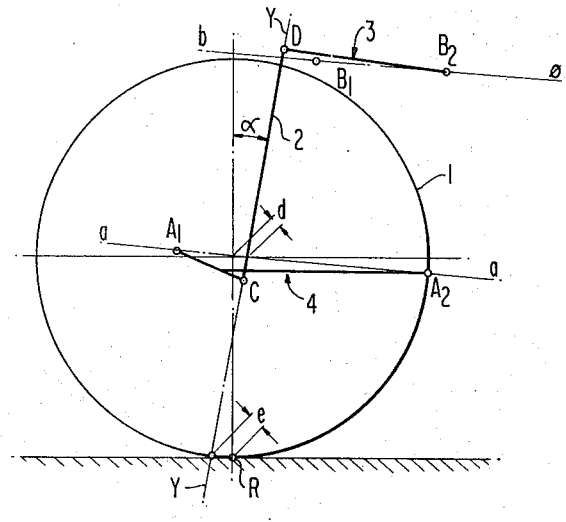
FIG. 1 is a schematic side view of one embodiment of a front wheel suspension for motor vehicles according to the present invention.
Figure 2:
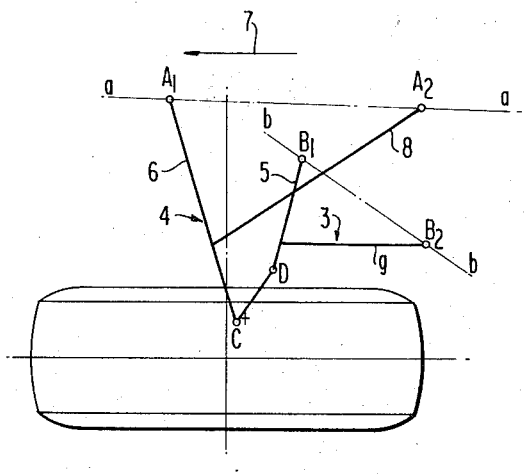
FIG. 2 is a schematic plan view of the wheel suspension according to FIG. 1.
Figure 3:
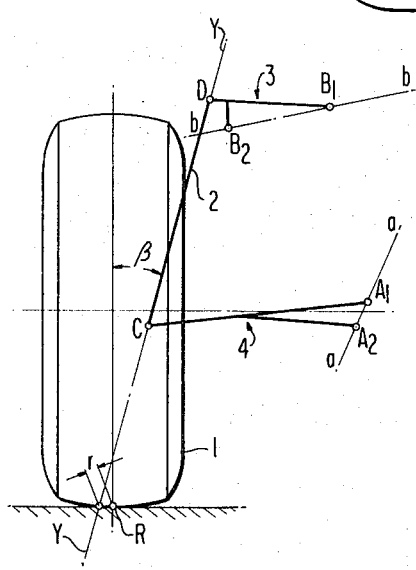
FIG. 3 is a schematic rear elevational view of the wheel suspension according to FIGS. 1 and 2.

Referring now to the drawing wherein like reference numerals are used throughout the various views, and more particularly to the schematic illustration according to FIGS. 1 to 3 of a front wheel suspension according to the present invention for motor vehicles, the parts belonging to the steering system thus also the steering linkage and the steering gear are not shown in this schematic illustration. Instead, emphasized in the schematic views according to FIGS. 1 to 3 are essentially only those features by means of which the position of the steering axis $y—y$ of the steerable front wheels 1 is determined and by means of which thus also are determined the caster angle, front axle offset and angle of inclination of steering knuckle pivot and steering roll radius.

The position of the steering axis $y—y$ is determined by the upper point of pivotal connection D and the lower point of pivotal connection C of the wheel carrier 2 at the respective cross guide members of the wheel suspension, of which the upper cross guide member is generally designated by reference numeral 3 and the lower cross guide member generally by reference numeral 4. Both cross guide members 3 and 4 are constructed as triangular guide members and include, as is particularly illustrated in FIG. 2, a forward and a rear guide arm. Of these guide arms, the forward guide arms which are designated respectively by reference numeral 5 and 6, extend essentially transversely to the vehicle longitudinal direction 7 whereas the rear guide arms 8 and 9 extend respectively obliquely rearwardly and generally rearwardly so that the points of pivotal connection $A_1$, $A_2$ and $B_1$ and $B_2$ of the upper guide member 3 and of the lower guide member 4 on the body side, respectively, are at a relatively large distance with respect to one another in relation to the vehicle longitudinal direction 7. Corresponding to the relatively large distance, as measured in the vehicle longitudinal direction, of the points of pivotal connection $A_1$ and $A_2$ and of $B_1$ and $B_2$ on the body side, a relatively wide support base is presented for the cross guide members whereby the forces in the points of pivotal connection of the cross guide members 3 and 4 on the frame side are relatively small so that an elastic support in these points is possible without having to accept undesired steering inaccuracies.

Of the two guide arms of each of the cross guide members 3 and 4, the forward guide arms 5 and 6 extend essentially transversely to the vehicle longitudinal direction 7 whereby the forward guide arm 6 of the lower guide member 4 is slightly inclined forwardly from its point of pivotal connection C with the wheel carrier 2 and the forward guide arm 5 of the upper cross guide member 3 is slightly inclined toward the rear from its point of pivotal connection D with the wheel carrier 2. The rear guide arm 8 extends rearwardly obliquely to the vehicle longitudinal direction and the rear guide arm 9 extends rearwardly nearly parallel to the vehicle longitudinal direction and thus form the respective longitudinal support. The pivot axis $a—a$ of the lower cross guide member 4 is disposed with a slight inclination downwardly toward the rear, as viewed in side view (FIG. 1) and nearly parallel to the vehicle longitudinal direction as viewed in plan view (FIG. 2). The pivot axis $b—b$ of the upper cross guide member 3 is also only slightly downwardly inclined toward the rear as viewed in side view (FIG. 1) but extends, as viewed in plan view, (FIG. 2), obliquely forwardly and inwardly, and more particularly in the illustrated embodiment at an angle of about 35° to the vertical cross plane containing the wheel axes.

As a result of the position of the points of pivotal connection C and D for the wheel carrier 2, the steering axis $y—y$ of the wheels 1 is so determined and fixed that the steering axis $y—y$ (as viewed in side view according to FIG. 1) intersects the vertical vehicle cross plane containing the wheel axes with an inclination obliquely downwardly and forwardly at a point intermediate the wheel center and the point of contact R of the wheel with the road surface. From this results a positive caster $e$ (FIG. 1) for the respective wheel 1 with an offset $d$. The magnitude of the caster angle $\alpha$ amounts in the illustrated schematic embodiment about 7° to about 10°.

It can be seen from FIG. 3 that the steering axis $y—y$ is also inclined with respect to the longitudinal center wheel plane and intersects the same within the area between the wheel center and the point of wheel contact R with the road surface. A negative steering roll radius $-r$ results therefrom. The angle of inclination of the steering axis $y—y$ designated frequently as angle of kingpin inclination with respect to the wheel plane carries the reference character $\beta$ and in the illustrated embodiment is of the order of magnitude of about 12°.

A relatively small distance between the wheel center point and the steering pivot axis results from the described position of the steering axis $y—y$ which with an offset has a relatively large positive caster angle and which has a steering roll radius $r$ of $\leq 0$, with the consequence that the wheels during the deflection have a relatively slight space requirement in the vehicle width as also in the vehicle length so that in conjunction with the described front wheel suspension, which includes a steering system located essentially to the rear of the vehicle cross plane containing the wheel centers, also tires of large width can be used.

Figure 4:
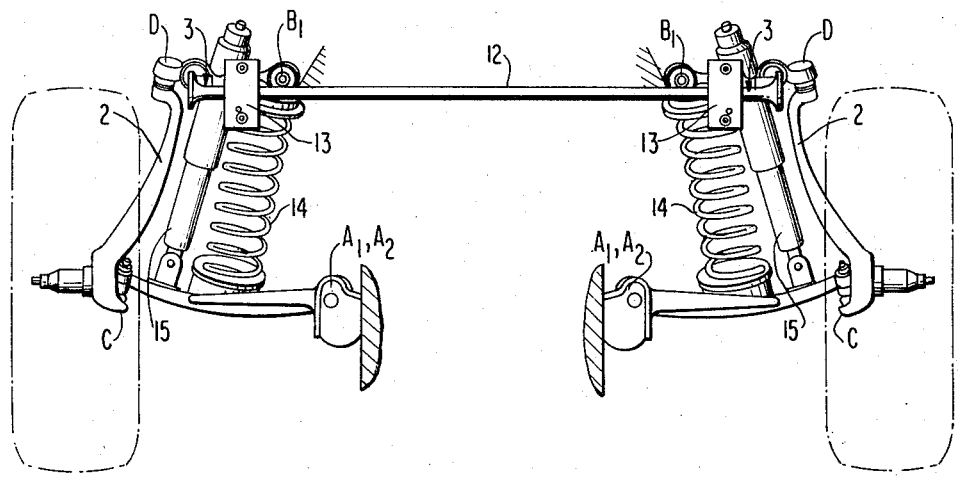
FIG. 4 is a rear elevational view of one practical embodiment of a front wheel suspension according to the present invention.
Figure 5:
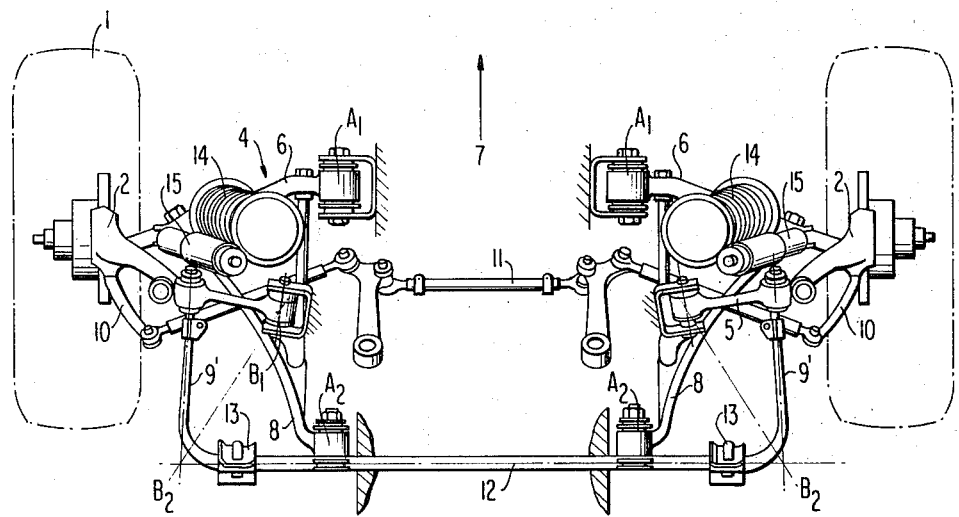
FIG. 5 is a plan view on the front wheel suspension according to FIG. 4.

FIGS. 4 and 5 illustrate a practical embodiment of a front wheel suspension according to FIGS. 1 to 3 which will be explained hereinafter only insofar as the necessary has not already been described with reference to FIGS. 1 to 3. The reference numerals used in FIGS. 1 to 3 are thereby also used in FIGS. 4 and 5 to designate the same parts.

Over and above that shown in FIGS. 1 to 3, one can see especially from FIG. 5 the location of the steering linkage to the rear of the vehicle cross plane containing the wheel centers whereby the steering track levers secured at the wheel carriers are designated by reference numeral 10. Altogether the steering linkage is generally designated by reference numeral 11. The steering gear (not shown) is thereby disposed in the illustrated embodiment, as indicated by the construction of the steering linkage 11, also to the rear of the vehicle cross plane containing the wheel centers.

The illustration according to FIGS. 4 and 5 shows, over and above what has been explained by reference to FIGS. 1 to 3, an essentially U-shaped curved stabilizer rod 12 which is disposed at the height of the upper cross guide member 3 and is supported on the frame side in points of pivotal connection 13. The arms of the stabilizer rod 12 form in the illustrated embodiment the rearward guide arms of the upper guide member 3 and are correspondingly designated by reference numeral 9'.

As is further shown by the illustrated embodiment, the vehicle support springs 14 and the shock absorbers 15 are respectively supported on the forward arm 6 of the lower cross guide member. The shock absorber 15 is thereby disposed between the respective spring 14 and associated wheel 1.

In contradistinction to FIG. 5, the steering linkage which is disposed essentially at the height of the lower cross guide member 4 is not illustrated in FIG. 4 in order not to encumber the showing according to FIG. 4.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A front wheel suspension for motor vehicles which comprises a steering means disposed at least essentially to the rear of a vehicle cross plane containing the wheel centers and including steering linkage means and a steering gear, and wheel guide means including cross guide means having forward guide arms extending substantially in the vehicle transverse direction and rear guide means forming the longitudinal support of the suspension, said cross guide means being elastically retained at relatively fixed parts of the vehicle in points of pivotal connection thereof which form a relatively wide support base, and said wheel guide means being pivotally connected with a respective wheel carrier means, characterized in that the steering axis of a respective wheel which is determined by the points of pivotal connection of the cross guide means with the wheel carrier means extends obliquely downwardly and forwardly, as viewed in side view, and intersects the vehicle cross plane containing the wheel centers at a point intermediate a respective wheel center and the point of contact of the respective wheel with the road surface, the steering axis being so inclined to a respective wheel plane that a steering roll radius results which is at most equal to zero.

2. A front wheel suspension according to claim 1, characterized in that the steering roll radius is smaller than zero.

3. A front wheel suspension for vehicles with a superstructure according to claim 1, with shock absorber means and coil spring means supporting the suspension with respect to the superstructure, characterized in that the upper cross guide means is disposed to the rear of the shock absorber means and coil spring means in relation to the vehicle longitudinal direction.

4. A front wheel suspension according to claim 3, characterized by a stabilizer torsion rod means disposed substantially at the height of the upper cross guide means.

5. A front wheel suspension according to claim 4, characterized in that the stabilizer rod means is of substantially U-shape having forwardly extending leg portions forming the rear guide arms of the upper cross guide means.

6. A front wheel suspension according to claim 5, characterized in that the shock absorber and coil spring means are supported on the forward arm of the lower cross guide means.

7. A front wheel suspension according to claim 6, characterized in that the pivot axes of the upper and lower cross guide means extend rearwardly downwardly with a slight inclination to the horizontal, as viewed in side view, and intersect one another, as viewed in plan view, generally within the area of the vehicle cross plane passing through the wheel centers.

8. A front wheel suspension according to claim 7, characterized in that the steering roll radius is smaller than zero.

9. A front wheel suspension according to claim 1, characterized by a stabilizer torsion rod means disposed substantially at the height of the upper cross guide means.

10. A front wheel suspension according to claim 9, characterized in that the stabilizer rod means is of substantially U-shape having forwardly extending leg portions forming the rear guide arms of the upper cross guide means.

11. A front wheel suspension according to claim 3, characterized in that the shock absorber and coil spring means are supported on the forward arm of the lower cross guide means.

12. A front wheel suspension according to claim 1, characterized in that the pivot axes of the upper and lower cross guide means extend rearwardly downwardly with a slight inclination to the horizontal, as viewed in side view, and intersect one another, as viewed in plan view, generally within the area of the vehicle cross plane passing through the wheel centers.

* * * * *